J. N. CADY.
Tobacco Plant Cutters.
No. 137,760.  Patented April 15 1873.
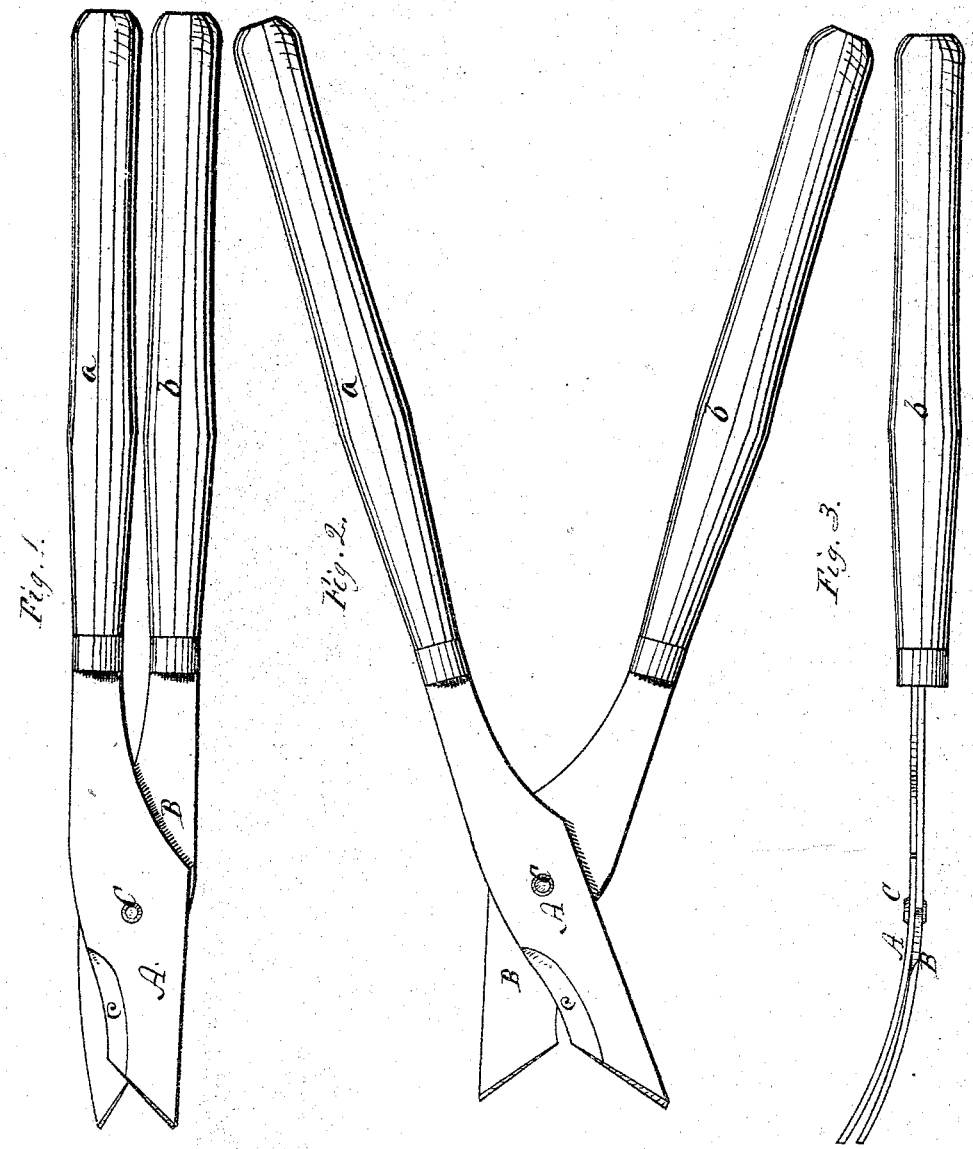

UNITED STATES PATENT OFFICE.

JAMES N. CADY, OF SOUTH HANNIBAL, NEW YORK.

IMPROVEMENT IN TOBACCO-PLANT CUTTERS.

Specification forming part of Letters Patent No. 137,760, dated April 15, 1873; application filed December 14, 1872.

*To all whom it may concern:*

Be it known that I, JAMES N. CADY, of South Hannibal, in the county of Oswego and State of New York, have invented an Improved Tobacco-Plant Cutter; and I do hereby declare that the following is a full and exact description thereof, reference being had to the accompanying drawing making part of this specification—

Figure 1 being a top view of the instrument with the cutting-blades closed together; Fig. 2, a top view thereof with the blades open or separated; Fig. 3, a side view of the instrument with the blades closed.

Like letters designate corresponding parts in all of the figures.

This instrument is intended for cutting off tobacco plants or stalks in the field. It consists of two blades, A and B, pivoted together at C, and provided, respectively, with handles $a\ b$, which, together with their shanks are, properly, about three or three and a half feet in length. The blades are curved or bent upward and forward from the line of the handles, as shown in Fig. 3, so that the operator can stand erect while reaching to cut off the tobacco-stalks under the heads thereof. The blades also are separated—say, an eighth of an inch from each other—below the pivot C, in order not to catch small stones or obstructions between them. Their ends are pointed outward, and extend obliquely inward therefrom, thereby forming a V-shaped notch between the same, as shown, so as to readily and without fail catch the tobacco-stalks therein. From the cutting-edge of the upper blade A a bevel, $c$, is formed of sufficient height and abruptness to push the stalks laterally at the lower end far enough to cause them to fall over and lie all in one direction.

What I claim as my invention, and desire to secure by Letters Patent, is—

The improved instrument for cutting tobacco-plants, having the curved blades A B with oblique ends pointing outward and the upper blade beveled and separated from the lower blade, substantially as and for the purpose herein specified.

Specification signed by me this 2d day of September, 1872.

JAMES N. CADY.

Witnesses:
OBALIAH KING,
GEO. G. WHITE.